Patented Feb. 16, 1954

2,669,574

UNITED STATES PATENT OFFICE 2,669,574

ESTERS OF ORGANIC SULFONIC ACIDS

Quentin E. Thompson, St. Louis, Mo., assignor to Monsanto Chemical Company, St. Louis, Mo., a corporation of Delaware No Drawing. Application February 15, 1952, Serial No. 271,847

11 Claims. (Cl. 260—456)

This invention relates to 4,4a,5,8-tetrahydro-2-alkoxy-4a-methyl-4-oxo-1-naphthyl esters of organic sulfonic acids. More specifically, this invention relates to such esters having the formula

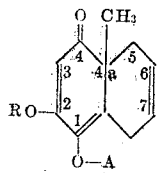

wherein R represents an alkyl radical containing from 1 to 5 carbon atoms and A represents an acyl radical derived from an organic sulfonic acid, and to a method for their preparation.

The novel esters of this invention are useful intermediates for the preparation of various organic compounds, particularly pharmaceuticals. These esters are exceptionally useful intermediates for the preparation of steroids. They may be conveniently prepared by reacting a 5,8-dihydro-4-hydroxy-3-alkoxy-8a - methyl - 1(8aH) - naphthalenone, alkali metal or alkaline earth metal salt, wherein the alkoxy group contains from 1 to 5 carbon atoms, and an organic sulfonic acid halide. The naphthalenone salts referred to may be represented by the following formula:

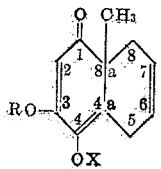

wherein R represents an alkyl radical containing from 1 to 5 carbon atoms and X represents an alkali metal or an alkaline earth metal. These naphthalenone salts exist in two optically active forms, viz., the dextro-rotary (d) and levo-rotary (l), and both forms and mixtures thereof can be used to prepare the corresponding optically active esters of this invention.

The following examples are illustrative, but not limitative, of the novel esters of this invention:

Example I

To 5.70 g. of dl-5,8-dihydro-4-hydroxy-3-methoxy-8a - methyl - 1(8aH) - naphthalenone, sodium salt, suspended in 50 ml. of dioxane at 100° C., is added 4.42 g. of benzenesulfonyl chloride. An immediate reaction occurs and the suspended sodium salt disappears. The reaction mixture is stirred for about 15 minutes and almost all of the dioxane then removed by distillation under reduced pressure. The remaining oil is poured into 50 ml. of ice water and the resultant mixture extracted with two 50 ml. portions of ether. The ether solution is dried over calcium sulfate and then concentrated to about 25 ml. by distillation. About 40 ml. of hot petroleum ether is added to the hot ether concentrate and the mixture is cooled, precipitating dl-4,4a,5,8-tetrahydro-2-methoxy - 4a - methyl-4-oxo-1-naphthyl benzenesulfonate which is recovered by filtration. After recrystallization from a mixture of ether and petroleum ether, this product has a melting point of 116.5°–116.9° C. and the following analysis:

Calculated for $C_{18}H_{18}O_5S$ _____ 9.24
Found _____ 9.13

Example II

Repeating the procedure described in Example I using 5.0 g. of p-cyanobenzenesulfonyl chloride in place of benzenesulfonyl chloride, substantially pure dl-4,4a,5,8-tetrahydro-2-methoxy-4a, methyl-4-oxo-1-naphthyl p-cyanobenzenesulfonate is obtained having a melting point of 133°–134° C. and the following analysis:

S
Calculated for $C_{19}H_{17}O_5NS$ _____ 8.63
Found _____ 8.68

Example III

To 5.70 g. of dl-5,8-dihydro-4-hydroxy-3-methoxy-8a-methyl-1(8aH) - naphthalenone, sodium salt, suspended in 50 ml. of dioxane at 100° C., is added 6.27 g. of freshly prepared d-camphor-10-sulfonyl chloride. The reaction mixture is stirred for about 15 minutes and almost all of the dioxane then removed by distillation under reduced pressure. The remaining oil is poured into 50 ml. of ice water and the resultant mixture extracted with two 50 ml. portions of ether. The ether solution is dried over calcium sulfate, decolorized with carbon and the ether distilled therefrom under reduced pressure, leaving an excellent yield of substantially pure dl-4,4a,5,8-tetrahydro-2-methoxy-4a-methyl-4-oxo-1-naphthyl d-camphor-10-sulfonate.

Example IV

In accordance with the procedure described in Example I, substantially pure dl-4,4a,5,8-tetrahydro - 2-ethoxy-4a-methyl-4-oxo-1-naphthyl 2-pentanesulfonate is obtained using 6.45 g. of dl - 5,8 -dihydro-4-hydroxy-3-ethoxy-8a-methyl-1(8aH)-naphthalenone, potassium salt, and 5.38 g. of 2-pentanesulfonyl bromide.

Example V

In accordance with the procedure described in Example I, substantially pure d-4,4a,5,8-tetrahydro - 2 - propoxy-4a-methyl-4-oxo-1-naphthyl beta-naphthalenesulfonate is obtained using 6.33 g. of d-5,8-dihydro-4-hydroxy - 3 - propoxy - 8a-methyl-1(8aH)-naphthalenone, calcium salt, and 5.66 g. of beta-naphthalenesulfonyl chloride.

Example VI

In accordance with the procedure described in

Example I, substantially pure bis (*l*-4,4a,5,8-tetrahydro - 2-pentoxy-4a-methyl-4-oxo-1-naphthyl) p-benzenedisulfonate is obtained using 7.5 g. of *l*-5,8-dihydro-4-hydroxy-3-propoxy-8a - methyl-1(8aH)-naphthalenone, potassium salt, and 3.4 g. of p-benzenedisulfonyl chloride.

In addition to the esters prepared in the preceding examples, the following esters are further illustrations of compounds coming within the scope of this invention:

4,4a,5,8 - tetrahydro - 2 - methoxy - 4a - methyl-4 - oxo - 1 - naphthyl ethanesulfonate 4,4a,5,8 - tetrahydro - 2 - ethoxy - 4a - methyl-4 - oxo - 1 - naphthyl 2-anthracenesulfonate 4,4a,5,8 - tetrahydro - 2 - propoxy - 4a - methyl-4 - oxo - 1 - naphthyl 1 - naphthalenemethanesulfonate 4,4a,5,8 - tetrahydro - 2 - isopropoxy - 4a - methyl - 4 - oxo - 1 - naphthyl m-nitrobenzenesulfonate 4,4a, 5,8 - tetrahydro - 2 - butoxy - 4a - methyl-4 - oxo - 1 - naphthyl p-chlorobenzenesulfonate 4,4a,5,8 - tetrahydro - 2 - isobutoxy - 4a - methyl - 4 - oxo - 1 - naphthyl 5 - quinolinesulfonate 4,4a, 5,8 - tetrahydro - 2 - pentoxy - 4a - methyl-4 - oxo - 1 - naphthyl benzylsulfonate 4,4a,5,8 - tetrahydro - 2 - propoxy - 4a - methyl-4 - oxo - 1 - naphthyl 2,4,5 - trimethylbenzenesulfonate 4,4a,5,8 - tetrahydro - 2 - isopropoxy - 4a - methyl - 4 - oxo - 1 - naphthyl - 2 - methyl-1-propanesulfonate 4,4a,5,8 - tetrahydro - 2 - methoxy - 4a - methyl-4 - oxo - 1 - naphthyl p-formylbenzenesulfonate 4,4a,5,8 - tetrahydro - 2 - pentoxy - 4a - methyl-4 - oxo - 1 - naphthyl p-toluenesulfonate 4,4a,5,8 - tetrahydro - 2 - butoxy - 4a - methyl-4 - oxo - 1 - naphthyl o - bromobenzenesulfonate 4,4a,5,8 - tetrahydro - 2 - isobutoxy - 4a - methyl - 4 - oxo - 1 - naphthyl o-toluenesulfonate 4,4a, 5,8 - tetrahydro - 2 - ethoxy - 4a - methyl-4 - oxo - 1 - naphthyl p-methoxybenzenesulfonate While the preceding examples have illustrated specific embodiments of this invention, both as to the nature of the novel esters and their method of preparation, it will be obvious to those skilled in the art that substantial variation in the reactants and reaction conditions set forth in these examples is possible without departing from the scope of this invention. For example, the 4,4a,5,8-tetrahydro-2-alkoxy-4a-methyl-4-oxo-1-naphthyl esters, wherein the alkoxy group contains from 1 to 5 carbon atoms, of any organic mono or poly sulfonic acids are contemplated as coming within the scope of this invention. Typical of such organic sulfonic acids are the acyclic and alicyclic sulfonic acids, the aryl and aralkyl sulfonic acids, and the heterocyclic sulfonic acids as illustrated by the preceding examples. Such acids may be unsubstituted or mono or poly substituted with one or more substituents.

In preparing the novel esters of this invention, any of the halides, such as chloride, bromide, fluoride or iodide of the aforementioned acids, may be utilized in the reaction with the 5,8-dihydro - 4 - hydroxy - 3 - alkoxy - 8a - methyl - 1(8aH)-naphthalenone, alkali metal or alkaline earth metal salt, wherein the alkoxy group contains from 1 to 5 carbon atoms. Similarly, any of the aforementioned alkali metal or alkaline earth metal salts of the described naphthalenones may be utilized in this process, such as the sodium, potassium, lithium, calcium, barium, magnesium, etc., salts.

The esterification reaction may be carried out in any inert reaction medium. Inert organic liquids which are particularly useful reaction mediums include dioxane, lower alkyl ethers, toluene, xylene, etc. Certain of these esters, such as the benzenesulfonate esters, may be prepared by carrying out the reaction as described in water.

The quantities of reactants utilized in the novel process of this invention are also subject to substantial variation. Approximately equivalent proportions of the naphthalenone salt and the organic sulfonic acid halide are particularly preferred.

The naphthalenone salts utilized in preparing the novel esters of this invention are described and claimed in my copending application Serial No. 253,554, filed October 27, 1951.

What is claimed is:

1. As new chemical compounds, 4,4a,5,8-tetrahydro - 2 - alkoxy - 4a - methyl - 4 - oxo - 1 - naphthyl esters of organic sulfonic acids, wherein said alkoxy group contains from 1 to 5 carbon atoms.

2. 4,4a,5,8 - tetrahydro - 2 - methoxy - 4a - methyl-4-oxo-1-naphthyl benzenesulfonate.

3. 4,4a,5,8 - tetrahydro - 2 - methoxy - 4a - methyl-4-oxo-1-naphthyl p-cyanobenzene sulfonate.

4. 4,4a,5,8 - tetrahydro - 2 - methoxy - 4a - methyl-4-oxo-1-naphthyl camphorsulfonate.

5. 4,4a,5,8 - tetrahydro - 2 - methoxy - 4a - methyl-4-oxo-1-naphthyl camphor-10-sulfonate.

6. 4,4a,5,8 - tetrahydro - 2 - ethoxy - 4a - methyl-4-oxo-1-naphthyl 2-pentanesulfonate.

7. 4,4a,5,8 - tetrahydro - 2 - propoxy - 4a - methyl-4-oxo-1-naphthyl beta-naphthalenesulfonate.

8. A process for the preparation of 4,4a,5,8-tetrahydro - 2 - alkoxy - 4a - methyl - 4 - oxo - 1-naphthyl esters of organic sulfonic acids, wherein said alkoxy group contains from 1 to 5 carbon atoms, which comprises reacting a salt selected from the group consisting of 5,8-dihydro - 4 - hydroxy - 3 - alkoxy - 8a - methyl - 1(8aH)-naphthalenone, alkali metal and alkaline earth metal salts, wherein the alkoxy group contains from 1 to 5 carbon atoms, and an organic sulfonic acid halide.

9. A compound of the group consisting of the dextro-rotary 4,4a,5,8-tetrahydro-2-alkoxy-4a-methyl-4-oxo-1-naphthyl ester of an organic sulfonic acid, wherein said alkoxy group contains 1 to 5 carbon atoms, and the levo-rotary 4,4a,5,8-tetrahydro-2-alkoxy-4a-methyl-4-oxo-1-naphthyl ester of an organic sulfonic acid wherein said alkoxy group contains 1 to 5 carbon atoms.

10. The dextro-rotary isomer of 4,4a,5,8-tetrahydro - 2 - methoxy - 4a - methyl - 4 - oxo - 1 - naphthyl ester of an organic sulfonic acid.

11. The levo-rotary isomer of 4,4a,5,8-tetrahydro - 2 - methoxy - 4a - methyl -4 - oxo - 1 - naphthyl ester of an organic sulfonic acid.

QUENTIN E. THOMPSON.

References Cited in the file of this patent

UNITED STATES PATENTS

| Number | Name | Date |
|---|---|---|
| 2,373,298 | Dougherty et al. | Apr. 10, 1945 |